Dec. 23, 1930. G. H. JAMES 1,786,305
SCREW JACK
Filed Jan. 27, 1927 2 Sheets-Sheet 1

INVENTOR.
George H. James
BY M. C. Frank
ATTORNEY.

Dec. 23, 1930.  G. H. JAMES  1,786,305
SCREW JACK
Filed Jan. 27, 1927    2 Sheets-Sheet 2

INVENTOR.
George H. James
BY M. C. Frank
ATTORNEY

Patented Dec. 23, 1930

1,786,305

UNITED STATES PATENT OFFICE

GEORGE H. JAMES, OF OAKLAND, CALIFORNIA, ASSIGNOR OF ONE-HALF TO FRANK H. SIMPSON, OF OAKLAND, CALIFORNIA

SCREW JACK

Application filed January 27, 1927. Serial No. 163,860.

This invention relates to improvements in screw-jacks and more particularly to quick-acting screw-jacks adapted for use in "jacking up" automobiles or like heavy objects.

My invention contemplates the use of an elevating screw somewhat similar to that commonly used in ordinary screw-jack construction, except that the screw is horizontally disposed and preferably provided with right and left-hand threaded shanks, bearing correspondingly threaded spaced nut members having toggle members of opposite disposition, to which are secured a supporting base and elevating head, the said nut members being adapted, upon the rotation of the screw, to travel toward or away from each other, to elevate or lower the head, as the case may be.

It will be apparent from the foregoing, that a jack constructed in accordance with this invention has but few parts and is exceedingly compact, and when in its lowermost position may be readily inserted under objects resting close to the floor or other surface, wherein the limited space is too small for the ordinary screw-jack.

The principal object of the invention is the provision of a screw-jack that has considerable range of vertical movement and that when in its retracted position may be inserted into small spaces or under objects resting very close to any working surface, such as the floor or ground level.

Another object of the invention is the provision of a screw-jack that is exceptionally compact, quick-acting, powerful, of very simple construction, and that combines in its construction a horizontally-disposed elevating screw.

A further object of the invention is the provision of a screw-jack of the class indicated, that has a conveniently arranged actuating handle designed for ease of manipulation and to which manual power may be readily and advantageously applied.

Other objects and advantages of my invention will be more clearly brought out with reference to the accompanying two sheets of drawings and subjoined specification, in which.

Figures 1, 2:
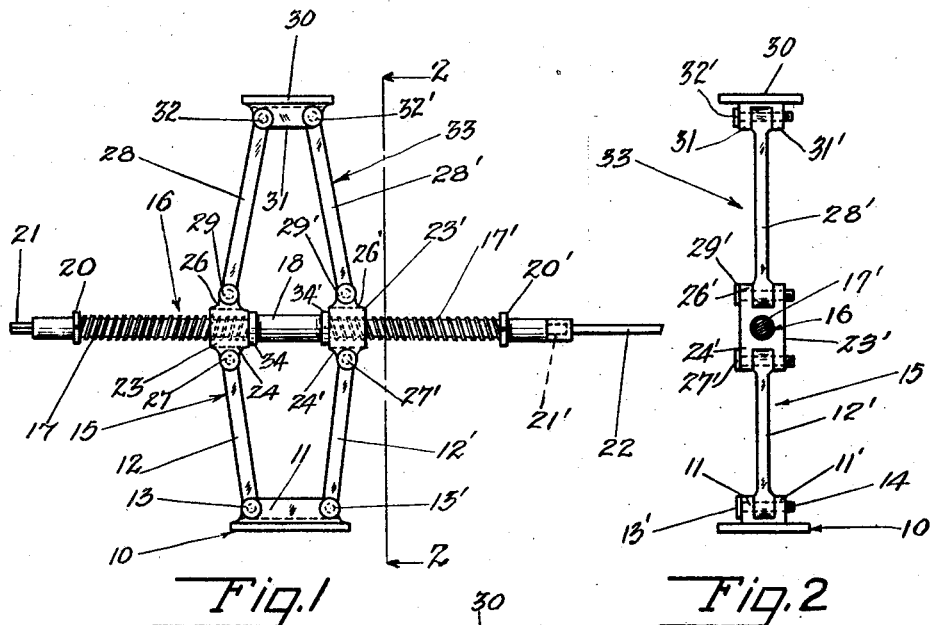
Figure 1 is a side elevation illustrating the preferred embodiment of my inventon, and in which the device is shown in its limiting elevated position.
Fig. 2 is an end elevation with the elevating screw shown in section, the view being indicated by the line 2—2 of Fig. 1.

Referring to the drawing with great particularity, the numeral 10 designates a rectangular-shaped base plate having upstanding flanges 11 and 11' integrally formed thereon, and sufficiently spaced apart to accommodate a pair of spaced links 12 and 12' hingedly secured at their lower ends to the plate 10 by means of bolts 13 and 13' which are held in place by cotter pins 14, the whole forming a toggle member 15.

The elevating screw 16 consists of a spindle having right and left-hand threaded sections 17 and 17' of course pitch provided with a centrally-disposed spacing member 18, end stop-collars 20 and 20', and outer squared extremities 21 and 21' for the reception of a socket wrench 22.

The elevating screw sections 17 and 17' are provided with a pair of correspondingly threaded nut members 23 and 23' which travel back and forth as the screw is rotated. The said nut members are provided with lower sets of ears 24, 24' and upper sets of ears 26 and 26', respectively; the lower sets are hingedly connected to the upper ends of the links 12 and 12' by the bolts 27 and 27', and the upper sets 26 and 26' are connected to the upper pair of links 28 and 28' by the bolts 29 and 29'.

The upper extremities of the links 28 and 28', are hinged to the head plate 30 which is provided with flanges 31 and 31', between which the upper links extend and to which they are secured by the bolts 32 and 32', the whole forming a toggle member 33 similar to the lower toggle member 15.

Figure 3:
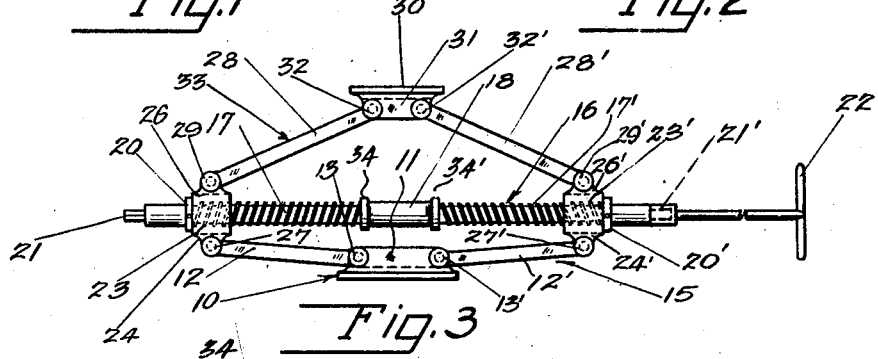
Fig. 3 is a side elevation analogous to Fig. 1, except that it shows the jack in its retracted or lowermost position.

The spacing member 18 is provided with stop flanges 34 and 34' for limiting the inward movement of the nut members 23 and 23' and determining the uppermost limit of travel of the head 30; and the elevating-screw collars 20 and 20' limit the outward movement of said nut members and determine the lowermost limit of movement of said head, and further prevent the lower links from passing beyond their dead centers when in the position shown in Fig. 3.

Figure 4:
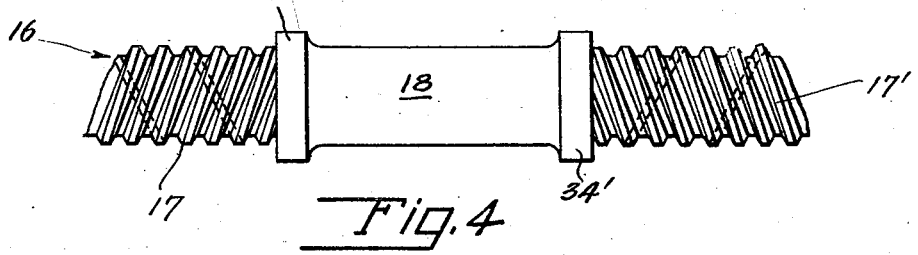
Fig. 4 is an enlarged detail view illustrating the central portion of the elevating screw and which is provided with a centrally disposed spacing section forming stops to limit the inward movement of the nut members; the screw is shown provided with right and left-hand threaded sections.
Figure 5:
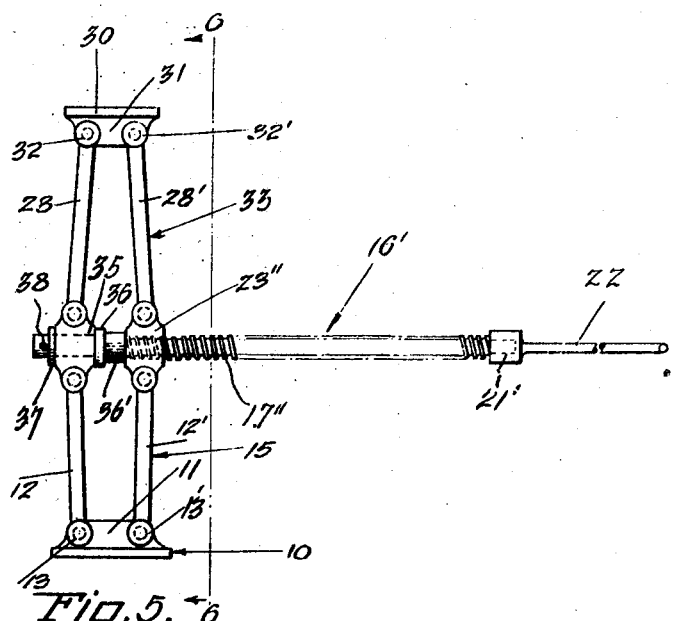
Fig. 5 is a side elevation embodying a modified structure of the invention and in which a single-threaded elevating screw is used; this form is provided with but one nut member and one extremity of the elevating screw is swivelled in a bearing member as shown.
Figure 6:
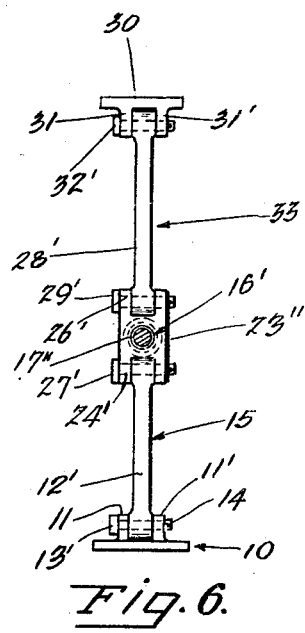
Fig. 6 is an end elevation with the elevating screw shown in cross section, the view being indicated by the line 6—6 of Fig. 5.
Figure 7:
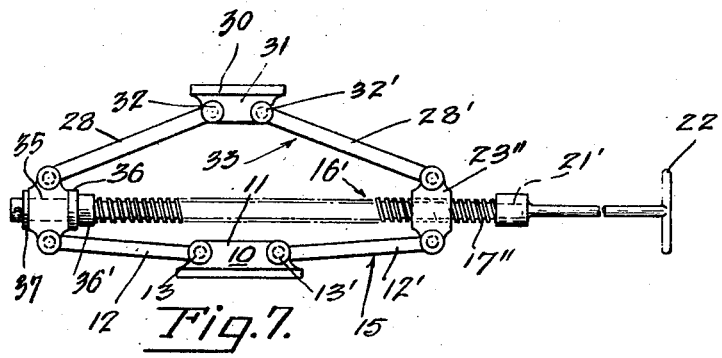
Fig. 7 is a side elevation showing the jack in its lowermost position.
Figure 8:
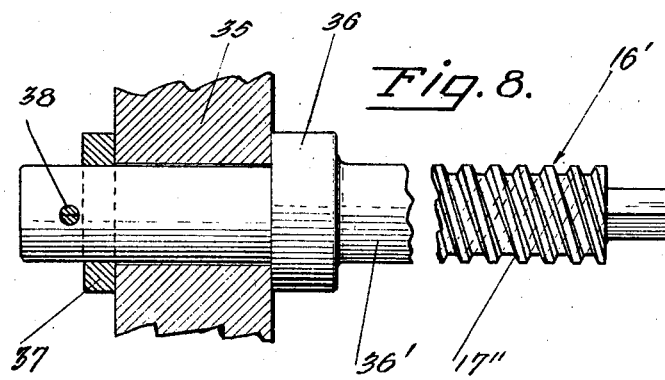
Fig. 8 is an enlarged sectional detail showing the elevating screw and its outer bearing member.

The elevating-screw sections 17 and 17' are provided with a suitable heavy thread having a steep pitch as shown in detail in Figure 4, the pitch of these threads determining the speed with which the head 30 is elevated by ordinary manipulation of the socket wrench 22.

It will be apparent with reference to the modification shown in Figures 5 to 8 inclusive, that the elevating screw 16' may be provided with a single right-hand thread 17'' and a nut member 23'' threaded in a manner similar to the nut member 23', while the member 35 corresponding to the nut member 23 is held in the swivel bearing formed on the inner end of the screw. The bearing consists of a flange 36 and stop shoulder 36' and a collar 37 held in place by a pin 38, and as thus constituted allows the free rotation of the screw relative thereto. An arrangement of this character functions in a manner similar to the form shown in Figures 1 to 4 inclusive, except that the one screw and nut do the work of the two in the former; the rest of the construction is considerably less and such a jack has a greater range of vertical movement.

It is obvious from the foregoing that I have produced a screw-jack which is exceedingly simple in construction and operation, and that by the utilization of the horizontal screw arrangement, permits of the jack's insertion into much smaller spaces than the ordinary jack having a vertically-arranged screw, and furthermore, a jack constructed in accordance with the principles of my invention, is decidedly quicker in action than the ordinary screw-jack in universal use.

What I claim as new and desire to secure by Letters Patent of the United States, is the following:

1. In a screw-jack of the class described, an elevating screw having right and left-hand threaded sections, correspondingly threaded nut members carried by said screw sections, a base for engagement with a fixed object, a head for engagement with a relatively movable object, toggle members of equal length pivotally connecting said nut members with said head, and toggle members of equal length pivotally connecting said nut members with said base, said last toggle members being shorter than said first toggle members.

2. In a screw-jack of the class described, an elevating screw having right and left-hand threaded sections separated by an integral collar section, correspondingly threaded nut members carried by said threaded screw sections and engageable with said collar section as a stop therefor when said screw-jack is fully extended, a base for engagement with a fixed object, a head for engagement with a relatively movable object, a pair of toggle members of like length connecting said nut members with said head, a second pair of toggle members of like length connecting said nut members with said base, the toggle members of one pair thereof being shorter than those of the other pair whereby the toggle members of the shorter pair will define a larger angle than that defined by the toggle members of the other pair when the screw-jack is contracted, and stop means on said screw operative against said nuts to limit the maximum angle definable by the toggle members of the shorter pair to a value less than and approximating one hundred eighty degrees.

In testimony whereof, I affix my signature.

GEORGE H. JAMES.